United States Patent

[11] 3,573,701

| [72] | Inventors | Marvin M. Graham<br>San Pedro;<br>Frank J. Heinz, Garden Grove; Lambert F. Craemer, Orange, Calif. |
|---|---|---|
| [21] | Appl. No. | 774,254 |
| [22] | Filed | Nov. 8, 1968 |
| [45] | Patented | Apr. 6, 1971 |
| [73] | Assignee | Robertshaw Controls Company<br>Richmond, Va. |

[54] ANTICIPATION DROOP COMPENSATION FOR SPACE THERMOSTATS
24 Claims, 5 Drawing Figs.

[52] U.S. Cl. .................................................. 337/378
[51] Int. Cl. .................................................. H01h 37/14, H01h 37/20, H01h 37/52
[50] Field of Search .................................................. 337/40, 81, 88, 100, 360, 377, 378, 101, 366

[56] References Cited
UNITED STATES PATENTS

| 2,158,435 | 5/1939 | Shaw | 337/378X |
| 2,129,477 | 9/1938 | Parks | 337/360 |
| 2,225,975 | 12/1940 | Bruce | 337/100 |
| 2,733,315 | 1/1956 | Richardson | 337/377 |
| 2,830,155 | 4/1958 | Smilo | 337/88 |
| 2,969,917 | 1/1961 | Nason | 337/100 |
| 3,064,103 | 11/1962 | Biermann et al. | 337/40 |
| 3,190,988 | 6/1965 | Graham et al. | 337/378 |

Primary Examiner—Bernard A. Gilheany
Assistant Examiner—Dewitt M. Morgan
Attorneys—Auzville Jackson, Jr., Robert L. Marben and Christen, Sabol and O'Brien ABSTRACT: A space thermostat comprising a first bimetal which controls the operation of an on-off electric switch, an anticipator disposed adjacent the first bimetal, and a compensating second bimetal having a delayed thermal response and disposed so as to compensate for the response of the first bimetal to the anticipator after it has been energized for a period of time greater than the delay of the compensating second bimetal. One embodiment utilizes the compensating second bimetal as a cam follower to mechanically rotate the first bimetal in a direction opposite to its deflection in response to the anticipator, and another embodiment utilizes the compensating second bimetal to move one of the contacts of the electrical switch to compensate for the effect on the other contact due to deflection of the first bimetal in response to the anticipator.

Patented April 6, 1971

INVENTORS
MARVIN M. GRAHAM
FRANK J. HEINZ
LAMBERT F. CRAEMER

Christen, Sabol, O'Brien
ATTORNEYS

INVENTORS
MARVIN M. GRAHAM
FRANK J. HEINZ
LAMBERT F. CRAEMER

Christen, Sabol, O'Brien
ATTORNEYS

ANTICIPATION DROOP COMPENSATION FOR SPACE THERMOSTATS

BACKGROUND OF THE INVENTION

The present invention pertains to thermostats for controlling the temperature in a space and more particularly to such space thermostats utilizing anticipation and compensating for the droop associated with such anticipation.

The use of conventional nonanticipating thermostats in controlling the temperature in a space has the disadvantage that the temperature control system has a tendency to overshoot. In a heating system, for example, the contacts in the space thermostat close when the space temperature is below the set temperature to place the heating system in operation and raise the space temperature. When the space temperature increases to the set temperature, the space thermostat contacts will open to shut down the heating system; however, the heat being supplied to the space will not cease immediately because of the finite time required to shut down a heating system due to the nature of the control apparatus and also due to the interest of utilizing the heating system at the highest efficiency possible. That is, when the space thermostat calls for the heating system to shut down there is heat available in the ducts and heating apparatus of the heating system which should be utilized in the interest of efficiency along with the extra heat produced from the control apparatus delay. Thus, the space temperature overshoots the set temperature which causes discomfort and inefficiency.

In order to increase the efficiency of temperature control systems it is conventional to utilize a separate source of heat within the thermostat to anticipate heating of the space. For instance in a heating thermostat a heat anticipating resistor is connected in series with the thermostat contacts so that when the contacts are closed current flows through the resistor to generate heat. The effect of this heat is to raise the temperature sensed by the primary temperature responsive means; and, consequently, decrease the temperature differential of the thermostat to open the thermostat contacts before the space temperature increases to the set temperature thereby permitting the delay in cessation of heat supply to raise the space temperature to the set temperature. In a cooling thermostat the heat anticipation resistor is connected in parallel with the thermostat contacts so that when the contacts are open current flows through the resistor to generate heat. Thus, the primary temperature responsive means senses a temperature higher than the actual space temperature to decrease the temperature differential of the thermostat and cause closure of the thermostat contacts before the space temperature drops below the set temperature. The object of this operation is to compensate for the delay in starting the operation of the cooling system by anticipating the heating of the space.

Conventional anticipation thermostats have the disadvantage that while their operation and control is accurate with respect to short cycle times, a droop effect caused by premature operation of the thermostat is inherent with prolonged cycle times. For instance, in a heating thermostat, when the thermostat contacts are closed for a prolonged period of time, the heat generated by the heat anticipation resistor becomes out of proportion with the time delay associated with the cessation of heat, and the thermostat contacts will open prematurely due to the high temperature sensed by the primary temperature responsive means. The effect of the premature opening of the thermostat contacts is that the heating system shuts down before the space temperature increases to the set temperature; and, after the heat anticipation resistor has cooled sufficiently, the actual space temperature will be sensed and the thermostat will cycle again. Similarly, in a cooling thermostat if the thermostat contacts are open for a prolonged period of time the heat generated by the heat anticipation resistor becomes out of proportion with the delay associated with the cooling system operation, and the thermostat contacts will close prematurely due to the high temperature sensed by the primary temperature means. The effect of the premature closing of the thermostat contacts is that the cooling system will be placed in operation before there is an actual requirement therefor.

Thus, it is seen that the objects of providing a stable environment and efficient operation of the temperature control system sought by utilizing an anticipation thermostat are not obtained when the thermostat does not operate on short time cycles.

SUMMARY OF THE PRESENT INVENTION

Accordingly, an object of the present invention is to construct an anticipation thermostat that compensates for droop effect to provide accurate operation regardless of cycle time.

Another object of the present invention is to compensate for the droop effect in anticipation thermostats by utilizing a temperature responsive means having a delayed thermal response.

The present invention has another object in that an anticipation thermostat is constructed utilizing a primary temperature responsive means and a compensating temperature responsive means having a delayed thermal response in comparison to the thermal response of the primary temperature responsive means so that after prolonged energization of the heat anticipation means the compensating temperature responsive means will compensate for the response of the primary temperature responsive means to the heat from the anticipation resistor.

Another object of the present invention is to control a thermostatic switch by utilizing a first bimetal and a second bimetal having a delayed thermal response in comparison to the thermal response of the first bimetal to compensate for the droop effect in anticipation thermostats.

The present invention has another object in that a thermostatic switch has a first contact controlled by a first bimetal and a second contact controlled by a second bimetal having a delayed thermal response.

A further object of the present invention is to utilize a bimetal having a delayed thermal response as a cam follower is association with a spiral bimetal to compensate for the droop effect in an anticipation thermostat.

The present invention is advantageous over conventional thermostats in that a stable environment is obtained without loss in operational efficiency of an anticipated temperature control system, and relatively simple apparatus is utilized to obtain the aforesaid results.

The present invention is generally characterized in that a space thermostat comprises, in combination, electrical switch means having its operation controlled by a first temperature responsive means, an anticipator, second temperature responsive means having a delayed thermal response in comparison to the thermal response of the first temperature response means and means disposing the second temperature responsive means in a position relative to the electrical switch means and the first temperature responsive means so that the response of the first temperature responsive means to prolonged energization of the anticipator is compensated by movement of the second temperature responsive means.

Other objects and advantages of the present invention will become apparent from the following description taken in conjunction with the accompanying drawings.

DESCRIPTION OF THE PREFERRED EMBODIMENTS

Figure 1:
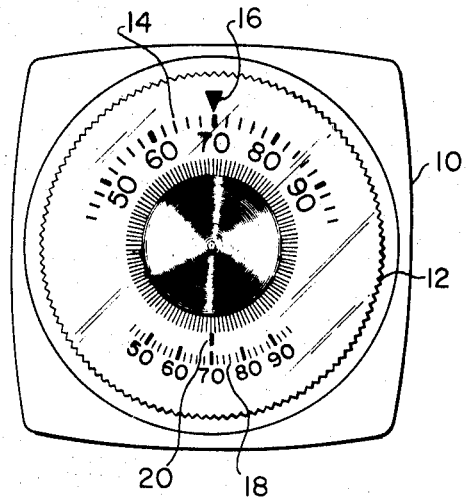
FIG. 1 is a front elevational view of a cover and dial assembly of a thermostat in accordance with the present invention.

FIG. 1 is a front view of the exterior cover and dial assembly of a thermostat constructed in accordance with the present invention. A generally square-shaped cover member 10 encases the body of the thermostat and has an aperture through its center to accommodate a hub of a transparent rotatable dial 12. The upper portion of cover member 10 has a temperature scale 14 disposed thereon for cooperation with a pointer 16 on the dial 12 to permit setting of the thermostat. Another temperature scale 18 is disposed on the lower portion of cover member 10 and a pointer 20 which is adapted to be connected with a conventional spiral bimetal temperature sensor disposed on the cover member, cooperates with the lower temperature scale 18 to indicate the actual space temperature.

Figure 2:
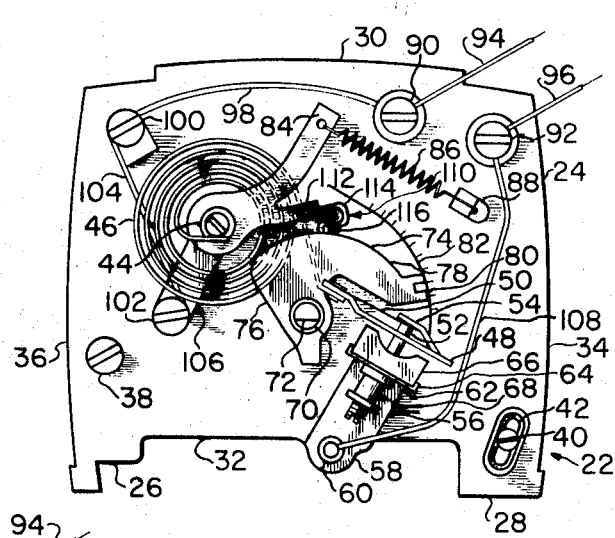
FIG. 2 is a front elevational view of an embodiment of a heating thermostat in accordance with the present invention.

With reference to FIG. 2, an embodiment of a heating thermostat 22 according to the present invention is illustrated comprising a mounting plate 24 adapted to have cover member 10 disposed thereover. The shape of mounting plate 24 is dependent on the apparatus to be mounted thereon and the shape of the cover member, and mounting plate 24 is illustrated as being substantially rectangular and having legs 26 and 28, upper edge 30, lower edge 32 and side edges 34 and 36 for exemplary purposed only.

Thermostat 22 may be mounted on a wall or fixture in any area or space to be temperature controlled by affixing mounting plate 24 to a backup plate or directly to a wall or other suitable supporting member by the use of mounting screws 38 and 40. Screw 40 is associated with a slot 42 to permit pivotal adjustment of plate 24 about screw 38 before screw 40 is tightened.

Cylindrical post apparatus 44 extends perpendicularly from mounting plate 24 and is secured to the back thereof so as to rotatably support a spiral bimetal 46 that has an inner end fastened to post apparatus 44 and a free outer end extending radially to support an armature 48 which is secured to bimetal 46 along with a spring leaf contact 50 in any conventional manner. Armature 48 has a slotted offset portion to receive a fixed contact 52 and a stop 54 is bent away from armature 48 to overlap the end of contact 50. Fixed contact 52 is supported by a bracket 56 that is firmly secured to plate 24 at a lug portion 58 that corresponds to a lug portion on plate 24 by a screw or rivet 60, and a ledge 62 having upturned flanges 64 extends from bracket 56 to securely hold a permanent magnet 66 having a bore through the center thereof aligned with a bore through ledge 62 to accommodate fixed contact 52. An adjustment screw 68 is connected with fixed contact 52 to provide adjustment of the gap between contacts 50 and 52 and thereby adjust the thermostat temperature differential.

A cam shaft 70 extends transversely from mounting plate 24 and has a flat portion 72 adapted to engage circular dial 12 on the face of the thermostat for selecting the desired space temperature to be maintained. A cam 74 has an apertured end 76 that is fastened to cam shaft 70 and a radially increasing arm 78 having a bifurcated tab 80 adapted to move along an arcuate temperature scale 82 on the face of mounting plate 24.

A cam follower 84 has an apertured end adapted to engage post apparatus 44 such that movement of cam follower 84 causes rotation of bimetal 46. The upper end of cam follower 84 has a small aperture for fastening one end of a spring 86, the other end of which is fastened to a notched spring support 88 that is secured to mounting plate 24.

Terminal posts 90 and 92 are provided on mounting plate 24 and are adapted to be connected to a source of electrical energy and an electrically operated heating valve or other heating system control means through leads 94 and 96. A wire 98 connects post 90 with a terminal 100 which in turn is connected to a terminal 102 through an anticipating resistor 104 located adjacent bimetal 46, and an electrical conductor strip 106 connects terminal 102 to bimetal 46 and contact 50 through post apparatus 44. Post 92 is connected with contact 52 through a wire 108 and bracket 56. Thus, it can be seen that a complete circuit through thermostat 22 is provided when contacts 50 and 52 are closed. The electrical wires have been shown on the face of mounting plate 24 for illustrative purposes, and it is understood that they will not be unnecessarily exposed in practice.

The thermostat structure thus far described is conventional, and the parts have been described without specificity in order to provide a general background to aid in understanding the present invention without obscuring it. A specific description of thermostat structure that may be utilized with the present invention can be found in U.S. Pat. No. 3,190,988 to Graham et al. assigned to the assignee of the present invention, and it is intended that the present invention not be limited to use with the illustrated structure since this structure is illustrated for exemplary purposes only.

A droop compensating, generally U-shaped bimetal 110 is attached to a short extension 112 of cam follower 84 having a shoulder for receiving and abutting a leg 114 of bimetal 110. Bimetal 110 has a flange 116 that is adapted to ride on the outer edge of cam 74, and thus it can be seen that bimetal 110 is an extension of cam follower 84 and transmits motion from cam 74 to cam follower 84. Bimetal 110 is relatively thick and heavy in comparison to bimetal 46 and is formed of two strips of metal with the outer strip having a greater coefficient of thermal expansion than the inner strip so that the distance between leg 114 and flange 116 of bimetal 110 increases and decreases with decreasing and increasing temperature, respectively.

The operation of thermostat 22 will now be described with respect to an arbitrary set temperature which is obtained by rotating circular dial 12 on the face of the thermostat. This moves cam shaft 70 to properly position cam 74 and the positioning of cam 74 is transmitted to bimetal 46 through bimetal 110 and cam follower 84 to set the gap between contacts 50 and 52 by moving armature 48. The temperature differential of the thermostat may be set by adjusting screw 68 to thereby adjust the gap between contacts 50 and 52.

Assuming the space temperature to be above the set temperature, contacts 50 and 52 will be open because bimetal 46 is constructed with the inner metal strip having a greater coefficient of thermal expansion than the outer metal strip so that an increase in temperature causes bimetal 46 to rotate counterclockwise.

When the space temperature drops below the set temperature, bimetal 46 will rotate clockwise to move armature 48 closer to magnet 66 until the magnetic attraction between magnet 66 and armature 48 overcomes bimetal 46 to close contacts 50 and 52 with snap action. After the contacts are closed a circuit is completed from lead 94 through post 90, wire 98, terminal 100, resistor 104, terminal 102, conductor strip 106, bimetal 46, contacts 50 and 52, bracket 56, wire 108 and post 92 to lead 96 thereby placing the heating system in operation to increase the space temperature.

Resistor 104 is provided to compensate for the delay between the opening of the contacts of thermostat 22 and the cessation of the supply of heat to the space. After contacts 50 and 52 are closed, a current flows through resistor 104 to cause it to emit heat which is sensed by bimetal 46. Thus, the heat emitted by resistor 104 causes counterclockwise rotation of bimetal 46 which tends to move contact 50 away from contact 52; and, consequently, the thermostat temperature differential is decreased and the space temperature at which contacts 50 and 52 open is lower than the desired or set space temperature. However, since the heating system does not shut down immediately upon the opening of contacts 50 and 52, the space temperature is increased to the set temperature, and thus it can be seen that the heat from resistor 104 anticipates the space temperature increase to prevent overshooting of the heating system.

The accuracy of this operation is satisfactory for short "on" cycles of the thermostat; however, when the thermostat remains "on" for a prolonged period of time, the heat emitted by resistor 104 becomes out of proportion to the delay of the heating system. Consequently, contacts 50 and 52 will open prematurely, and the space temperature will not have reached the desired or set temperature when the heating system shuts down. Thus, the heating system will be operated again after resistor 104 cools to permit the true space temperature to be sensed by bimetal 46. This operation, which is referred to as droop, is undesirable due to the instability of the space temperature and the inefficiency of the heating system operation.

Bimetal 110 overcomes this anticipation droop and provides an accurate anticipating thermostat by contracting to compensate for the counterclockwise rotation of bimetal 46 in response to heat from resistor 104. Thus, it can be seen that as bimetal 46 tends to move armature 48 away from magnet 66 in response to heat from resistor 104 cam follower 84 under the influence of the contraction of bimetal 110 and the tension of spring 86, tends to move armature 48 towards magnet 66 to compensate for the movement of bimetal 46.

By constructing bimetal 110 to be relatively heavy and thick in comparison with bimetal 46 and disposing bimetal 110 at a location relatively remote from resistor 104, bimetal 110 has a delayed thermal response in comparison to the response of bimetal 46. That is, the thermal response of bimetal 110 is slower than the termal response of bimetal 46, and bimetal 46 moves in response to the heat from resistor 104 before bimetal 110 moves. Consequently, the desirable accuracy of the anticipation operation for short "on" cycles of the thermostat is the same as explained with respect to the prior art without droop compensating bimetal 110; however, for long "on" cycles, bimetal 110 contracts after a time delay to compensate for the increasing heat of resistor 104 to provide accurate anticipation operation of the thermostat and avoid droop effects.

Figure 3:
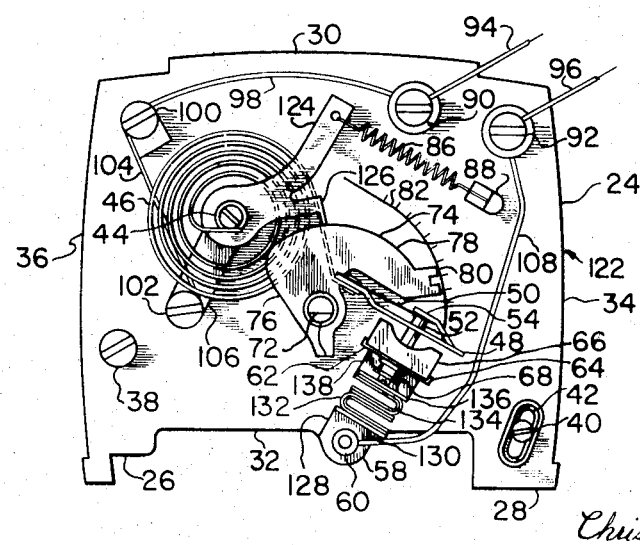
FIG. 3 is a front elevational view of another embodiment of a heating thermostat in accordance with the present invention.
Figure 4:
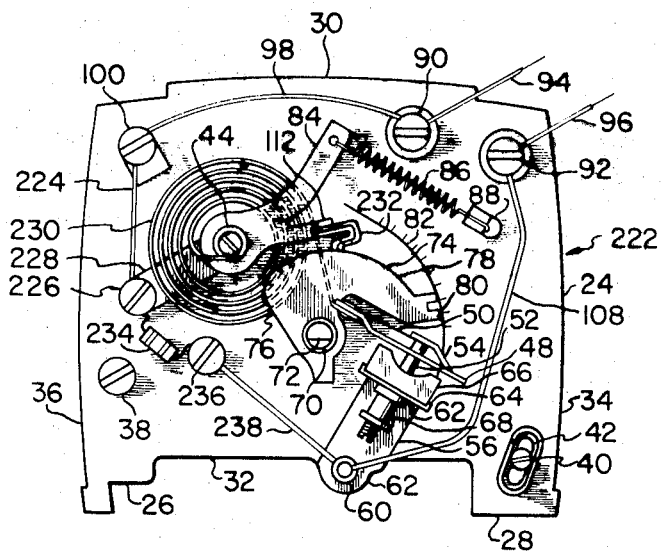
FIG. 4 is a front elevational view of an embodiment of a cooling thermostat in accordance with the present invention.
Figure 5:
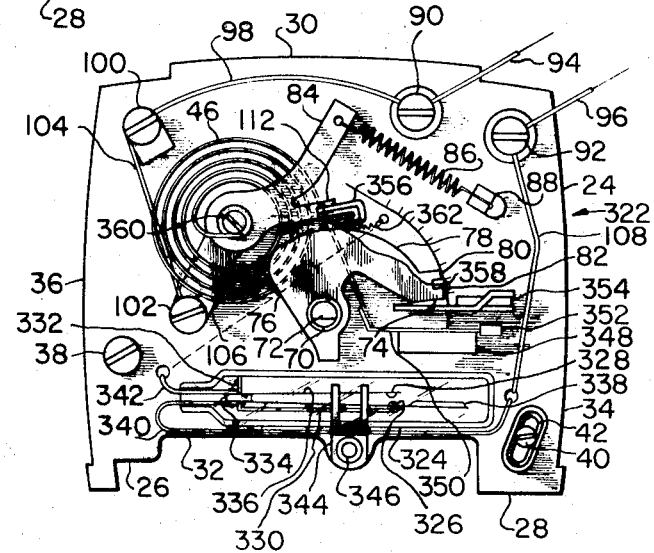
FIG. 5 is a front elevational view of another embodiment of a heating thermostat in accordance with the present invention.

Other embodiments of the present invention are illustrated in FIGS. 3, 4 and 5 and will be described hereinafter with the aid of identical reference numerals for those elements that are identical to elements in FIG. 2 and reference numerals with 100, 200 and 300 added for different elements in FIGS. 3, 4 and 5, respectively.

The embodiment illustrated in FIG. 3 compensates for droop by utilizing a bimetal to adjust the fixed contact rather than the movable contact as in the embodiment of FIG. 2. The structure of thermostat 122 of FIG. 3 is similar to thermostat 22 of FIG. 2 and will not be described again except for structure that differs therefrom. A cam follower 124 includes an extension 126 that is angled so as to ride on cam 74 as in a conventional thermostat such as that illustrated in U.S. Pat. No. 3,190,988. A bracket 128 is mounted on mounting plate 24 at lug portion 58 and is right angled to form a ledge 130, and a first U-shaped bimetal 132 has one leg attached to the top of ledge 130. A second U-shaped bimetal 134 has one leg attached to the other leg of bimetal 132, and the other leg of bimetal 134 is attached to a side 136 of a U-shaped support member 138 having a long side 62 with upturned flanges 64 for securing a magnet 66. An adjustment screw 68 is attached to a contact 52 and extends over side 136 in order to prevent side 136 from interfering with the adjustment of contact 52.

Bimetals 132 and 134 are thick and heavy in comparison to bimetal 46 and have a delayed thermal response in comparison to the thermal response of bimetal 46. Bimetals 132 and 134 are formed with the inner strips of metal having a greater coefficient of thermal expansion than the outer strips of metal so that an increase in temperature causes each of the bimetals to expand thereby moving contact 52 toward contact 50. Bimetal 46 is constructed with the inner strip of metal having a greater coefficient of thermal expansion than the outer strip of metal as explained with respect to the embodiment of FIG. 2 so that bimetal 46 rotates counterclockwise with increasing temperature and clockwise with decreasing temperature.

The operation of the embodiment of FIG. 3 is similar to the operation of FIG. 2; however, compensation for anticipation droop is obtained by moving contact 52 rather than contact 50. When the space temperature is above the set temperature, contacts 50 and 52 will be open due to the thermal response of bimetal 46.

When the space temperature drops below the set temperature, bimetal 46 will rotate clockwise to move armature 48 closer to magnet 66 until the magnetic attraction between magnet 66 and armature 48 closes contacts 50 and 52 with snap action. After the contacts are closed, a circuit is completed from lead 94 through post 90, wire 98, terminal 100, resistor 104, terminal 102, conductor strip 106, bimetal 46, contacts 50 and 52, support member 138, bimetals 134 and 132, bracket 128, wire 108 and post 92 to lead 96 to thereby operate the heating system to increase the space temperature.

As previously explained with respect to the embodiment of FIG. 2, the heat from resistor 104 is utilized to compensate for the delay between the opening of the contacts of thermostat 122 and the cessation of heat supply to the space. The heat from resistor 104 causes bimetal 46 to rotate counterclockwise thereby tending to move contact 50 away from contact 52. To compensate for the droop accompanying prolonged energization of resistor 104, bimetals 132 and 134 expand after a delay due to their slow thermal response and their remote location from resistor 104. Thus, it can be seen that if thermostat 122 is "on" for a prolonged period of time, the counterclockwise rotation of bimetal 46 due to the heat of resistor 104 will be compensated by the expansion of bimetals 132 and 134 in response to the heat of resistor 104 and the current flowing through the bimetals which develops internal heat to increase the thermal response of bimetals 132 and 134 and assist droop compensation. Thus, the droop ordinarily associated with prolonged operation of an anticipation thermostat is avoided.

When the space temperature increases to approach the set temperature, the combination of the space temperature and the heat from resistor 104 will cause bimetal 46 to rotate counterclockwise and overcome the magnetic attraction between magnet 66 and armature 48 to open contacts 50 and 52 and shut down the heating system. The delay in cessation of heat supply to the space will permit the space temperature to increase to the set temperature without overshoot.

An embodiment of a cooling thermostat in accordance with the present invention is illustrated in FIG. 4. Cooling thermostat 222 is structurally similar to thermostat 22 of FIG. 2 except for the differences hereinafter described. A wire 224 is connected between terminal 100 and a terminal 226 which is connected through a conductor strip 228 and post apparatus 44 to a spiral bimetal 230. Bimetal 230 is similar to bimetal 46 of FIG. 2 and is attached to post apparatus 44 and armature 48 in the same manner; however, the outer strip of bimetal 230 has a greater coefficient of thermal expansion than the inner strip of metal so that bimetal 230 rotates clockwise with increasing temperature and counterclockwise with decreasing temperature. Bimetal 232 is relatively thick and heavy in comparison to bimetal 230 so that bimetal 232 has a delayed thermal response in comparison to the thermal response of bimetal 230, and bimetal 232 has a leg attached to extension 112 of cam follower 84 and a flange adapted to ride on cam 74 similar to bimetal 110 of FIG. 2. However, the inner metal strip of bimetal 232 has a greater coefficient of thermal expansion than the outer metal strip so that bimetal 232 expands with increasing temperature and contracts with decreasing temperature.

An anticipation resistor 234 connects with terminal 226 and through a terminal 236, a wire 238 and bracket 56 to wire 108 to thereby connect resistor 234 in parallel with contacts 50 and 52. Thus, it can be seen that a circuit exists through thermostat 222 when contacts 50 and 52 are open. The current flowing through resistor 234 when contacts 50 and 52 are open causes heat to be emitted therefrom when the cooling system controlled through leads 94 and 96 is inoperative. Consequently, resistor 234 operates to anticipate the heating of the space to be temperature controlled by emitting heat when the thermostat is "off" to cause bimetal 230 to rotate clockwise and thereby decrease the temperature differential and anticipate the increase in space temperature. During short "off" cycles of the thermostat this operation is effective to accurately anticipate and control the space temperature. However, when thermostat 222 is "off" for a prolonged period of time, the heat from resistor 234 will cause bimetal 230 to rotate clockwise and close contacts 50 and 52 prematurely. This inaccurate operation is corrected by bimetal 232 which expands after a time delay in response to heat from resistor 234 to move cam follower 84 and thereby rotate bimetal 230 counterclockwise to mechanically compensate for its thermal response to resistor 234. The time delay is due to the slow thermal response of bimetal 232 and its remote location from resistor 234. Thus, it can be seen that accurate anticipation is provided by utilizing bimetal 232 to compensate for rotation of bimetal 230 for prolonged "off" cycles of thermostat 222.

Another embodiment of a thermostat according to the present invention is illustrated in FIG. 5. A heating thermostat 322 employs a glass enclosed switch 324 having a movable contact 326 and a fixed contact 328 disposed therein. Movable contact 326 is mounted on a flexible or movable blade 330 that is supported by a member 332 within switch 324 and is insulated from a rigid blade 336 on which fixed contact 328 is mounted by an insulator 334. Blade 330 extends beyond contact 326 and has an armature 338 suitably attached to the end thereof. Leads 340 and 342 extend from the end of switch 324 and connect with blades 330 and 336, respectively. Switch 324 is constructed such that the normal position of blade 330 in the absence of a substantial magnetic field is towards the bottom of the glass enclosure due to the weight of blade 330 and armature 338 and the shape of blade 330 thereby maintaining contacts 326 and 328 normally open. Switch 324 is supported on mounting plate 24 by a bifurcated bracket 344 which is suitably secured to mounting plate 24, such as by a rivet 346, to extend under and partly around the glass enclosure. Switch 324 is similar to that disclosed in U.S. Pat. No. 3,068,333 to John C. Hewitt, Jr. assigned to the assignee of the present invention and further details may be obtained therefrom.

The other components of thermostat 322 are similar to thermostat 22 of FIG. 2 except for the differences described hereinafter. A permanent magnet 348 is mounted on a rigid extension 350 which is attached to the free end of bimetal 46, and extension 350 has a rigid offset portion 352 extending beyond permanent magnet 348. An auxiliary armature 354 is mounted above extension 350 and is adapted to act as a stop for movement of extension 350 by abutment of offset portion 352 with its underside.

A U-shaped bimetal 356 has one leg attached to extension 112 of cam follower 84, and the other leg of bimetal 356 has an electrical insulator 358 attached to the end thereof, insulator 358 being adapted to ride on cam 74. Cam follower 84 is electrically connected with electrical conductor strip 106 through cylindrical post apparatus 360, and bimetal 46 is electrically insulated from conductor strip 106. A flexible wire 362 is connected to the free leg of bimetal 356 and extends along the back of mounting plate 24 to lead 342 of switch 324. Lead 340 of switch 324 connects with wire 108 which extends along the back of mounting plate 24 to terminal 92.

Bimetal 46 is formed with the inner strip of metal having a greater coefficient of thermal expansion than the outer strip of metal so that bimetal 46 rotates counterclockwise with increasing temperature and clockwise with decreasing temperature. Bimetal 356 is thick and heavy in comparison with bimetal 46 and has a delayed thermal response in comparison to the thermal response of bimetal 46. The outer strip of metal of bimetal 356 has a greater coefficient of thermal expansion than the inner strip of metal so that bimetal 356 expands with decreasing temperature and contracts with increasing temperature.

In operation, when the ambient space temperature is above the set temperature, bimetal 46 will be rotated counterclockwise sufficiently to permit the magnetic attraction between magnet 348 and auxiliary armature 354 to force extension 350 up so that offset portion 352 abuts the underside of auxiliary armature 354. Thus, contacts 326 and 328 are open, and there is no circuit completed through thermostat 322 thereby maintaining the heating system inoperative.

When the space temperature drops below the set temperature, bimetal 46 rotates clockwise to break the magnetic attraction between magnet 348 and auxiliary armature 354, magnet 348 moves to the surface of switch 324 with a snap action, and the magnetic attraction between magnet 348 and armature 338 closes contacts 326 and 328 with a snap action. Closure of contacts 326 and 328 completes a circuit through thermostat 322 from lead 94 through post 90, wire 98, terminal 100, resistor 104, terminal 102, conductor strip 106, extension 112 of cam follower 84, bimetal 356, wire 362, lead 342, contacts 326 and 328, lead 340, wire 108 and terminal 92 to lead 96; and, thus, power is supplied to the heating system to place it in operation to increase the space temperature.

As previously noted, the heat from resistor 104 is effective to compensate for the delay between opening of the contacts of thermostat 322 and the cessation of the supply of heat to the space during short cycle thermostatic operation by raising the temperature sensed by bimetal 46 thereby causing it to rotate counterclockwise to anticipate the heat produced during the delay by decreasing the temperature differential. However, in order to compensate for the droop effect which obtains when the thermostat is "on" for a prolonged period of time due to increased heat from resistor 104, bimetal 356 is provided. Due to its remote location from resistor 104 and its slow thermal response, the response of bimetal 356 to heat from resistor 104 is delayed; however, once bimetal 356 responds to the heat of resistor 104, it contracts to permit spring 86 to cause cam follower 84 to rotate clockwise and thereby mechanically rotate bimetal 46 clockwise to compensate for the counterclockwise rotation of bimetal 46 in response to the increased heat from resistor 104.

Thus far the operation of thermostat 322 is similar to the operation of thermostat 22 of FIG. 2; however, it is noted that the current through thermostat 322 flows through bimetal 356 and thereby internally develops heat to increase the thermal response of bimetal 356 and assist droop compensation.

When the space temperature approaches the set temperature due to operation of the heating system, the temperature sensed by bimetal 46 will be sufficient to rotate extension 350 counterclockwise due to the heat from resistor 104 to abut the underside of auxiliary armature 354 with snap action and open contacts 326 and 328 to shut down the heating system and deenergize resistor 104.

The basic concept of the present invention may be utilized with many different thermostat structures and is not intended to be limited to the associated structure illustrated herein. For instance, the primary bimetal, which is illustrated as having a spiral configuration, may have any desired configuration, such as a flat shape, a U-shape, an S-shape, etc., and similarly the compensating bimetal may have any desired configuration. Furthermore, other temperature responsive actuators may be utilized such as hydraulic bellows and thermally expansible members of unitary metal structure, and the present invention may be utilized in heating thermostats, cooling thermostats, and combined cooling and heating thermostats. Furthermore, the heat anticipation resistor may be replaced with any suitable heat generating means, and it may be adjustable to provide accurate heat anticipation for all situations.

Inasmuch as the present invention is subject to many modifications and changes in detail, it is intended that all matter described in the specification or shown in the drawings be interpreted as illustrative and not in a limiting sense.

We claim:

1. In a space thermostat, the combination comprising:
   thermally responsive electrical switch means having a first state and a second state and including temperature responsive means controlling the state of said thermally responsive electrical switch means, said temperature responsive means being responsive to temperatures above a set temperature to place said thermally responsive electrical switch means in said first state and responsive to temperature below the set temperature to place said thermally responsive electrical switch means in said second state;

anticipation heating means disposed in heating proximity to said temperature responsive means and being energized to heat said temperature responsive means to force said thermally responsive electrical switch means toward said first state; and compensating means coupled with said thermally responsive electrical switch means and having a slow thermal response in comparison to the thermal response of said temperature responsive means, said compensating means sensing heat from said anticipation heating means and moving in response to prolonged energization of said anticipation heating means to force said thermally responsive electrical switch means toward said second state whereby droop compensation is provided for prolonged cycles of operation.

2. The invention as recited in claim 1 wherein said thermally responsive electrical switch means includes a movable contact coupled with said temperature responsive means, said temperature responsive means includes primary bimetal means and support means supporting said primary bimetal means, and said compensating means includes compensating bimetal means engaging said support means whereby movement of said compensating bimetal means compensates for movement of said primary bimetal means in response to prolonged energization of said anticipation heating means.

3. The invention as recited in claim 2 wherein said primary bimetal means includes a spirally shaped member having a first end attached to said support means and a second end carrying said movable contact.

4. The invention as recited in claim 3 wherein said compensating bimetal means is thicker than said spiral member and has a slower thermal response than said primary bimetal means.

5. The invention as recited in claim 2 wherein said compensating bimetal means is electrically connected with said thermally responsive electrical switch means to permit current to pass through and heat said compensating bimetal means.

6. The invention as recited in claim 1 wherein said thermally responsive electrical switch means includes a movable contact coupled with said temperature responsive means and an adjustable fixed contact, said temperature responsive means includes primary bimetal means, said compensating means includes compensating bimetal means, and said compensating bimetal means engages said fixed contact whereby adjustment of said fixed contact due to movement of said compensating bimetal means compensates for movement of said primary bimetal means in response to prolonged energization of said anticipation heating means.

7. The invention as recited in claim 6 wherein said temperature responsive means includes support means for said primary bimetal means, said primary bimetal means is spirally shaped and has a first end attached to said support means and a second end carrying said movable contact.

8. The invention as recited in claim 7 wherein said compensating bimetal means is thicker than said primary bimetal means and has a slower thermal response than said primary bimetal means.

9. The invention as recited in claim 7 wherein said compensating bimetal means is electrically connected with said thermally responsive electrical switch means to permit current to pass through and heat said compensating bimetal means.

10. The invention as recited in claim 1 wherein said thermally responsive electrical switch means includes a contact and an armature both secured to a movable blade, said temperature responsive means includes primary bimetal means, a magnet carried by said primary bimetal means to control said movable blade and support means supporting said primary bimetal means, said compensating means includes compensating bimetal means, and said compensating bimetal means engages said support means whereby movement of said compensating bimetal means compensates for movement of said primary bimetal means in response to prolonged energization of said anticipation heating means.

11. The invention as recited in claim 10 wherein said primary bimetal means includes a spirally shaped member having a first end attached to said support means and a second end carrying said magnet, and said compensating bimetal means is a generally U-shaped member.

12. The invention as recited in claim 11 wherein said compensating U-shaped member is thicker than said spiral member such that said compensating bimetal means has a slower thermal response than said primary bimetal means.

13. The invention as recited in claim 10 wherein said compensating bimetal means is electrically connected with said thermally responsive electrical switch means to permit current to pass through and heat said compensating bimetal means.

14. The invention as recited in claim 1 wherein said anticipation heating means is connected in series with said thermally responsive electrical switch means, and said thermally responsive switch means is open when in said first state and closed when in said second state whereby said anticipation heating means is energized when said thermally responsive electrical switch means is closed.

15. The invention as recited in claim 1 wherein said anticipation heating means is connected in parallel with said thermally responsive electrical switch means, and said thermally responsive switch means is closed when in said first state and open when in said second state whereby said anticipation heating means is energized when said thermally responsive electrical switch means is open.

16. In a space thermostat, the combination comprising a mounting plate, electrical switch means disposed on said mounting plate and having first and second contacts, first bimetal means deflecting in a first direction in response to heat, means for rotatably mounting said first bimetal means on said mounting plate, said first bimetal means being coupled with said first contact of said electrical switch means to control the operation of said electrical switch means.

Anticipation heating means connected with said electrical switch means and disposed in heating proximity to said first bimetal means, and second bimetal means having a delayed thermal response in comparison to the thermal response of said first bimetal means, said second bimetal means engaging said second contact of said electrical switch means to move said second contact in a second direction opposite to said first direction to compensate for the response of said first bimetal means to prolonged energization of said anticipation heating means.

17. The invention as recited in claim 16 wherein said anticipation heating means is disposed adjacent said first bimetal means, and said second bimetal means is positioned relatively remotely from said anticipation heating means in comparison to the position of said first bimetal means whereby said first bimetal means responds to energization of said anticipation heating means before said second bimetal means responds thereto.

18. The invention as recited in claim 16 wherein said second bimetal means is thicker than said first bimetal means and has a slower thermal response than said first bimetal means whereby said first bimetal means responds to energization of said anticipation heating means before said second bimetal means responds thereto.

19. In a space thermostat, the combination comprising a mounting plate, electrical switch means disposed on said mounting plate and having first and second contacts, first bimetal means deflecting in a first direction in response to heat, means for rotatably mounting said first bimetal means on said mounting plate, said first bimetal means carrying said first contact of said electrical switch means to control the operation of said electrical switch means, anticipation heating means connected with said electrical switch means and disposed in heating proximity to said first bimetal means, and second bimetal means having a delayed thermal response in comparison to the thermal response of said first bimetal means, said second bimetal means engaging said means for rotatably mounting said first bimetal means on said mounting plate to rotate said first bimetal means in a second direction opposite to said first direction to compensate for the response of said first bimetal means to prolonged energization of said anticipation heating means.

20. The invention as recited in claim 19 wherein said anticipation heating means is disposed adjacent said first bimetal means, and said second bimetal means is positioned relatively remotely from said anticipation heating means in comparison to the position of said first bimetal means whereby said first bimetal means responds to energization of said anticipation heating means before said second bimetal means responds thereto.

21. The invention as recited in claim 19 wherein said second bimetal means is thicker than said first bimetal means and has a slower thermal response than said first bimetal means whereby said first bimetal means responds to energization of said anticipation heating means before said second bimetal means responds thereto.

22. In a space thermostat, the combination comprising a mounting plate, electrical switch means mounted on said mounting plate and including a fixed contact, a movable contact attached to a movable blade and an armature attached to said movable blade, first bimetal means deflecting in a first direction in response to heat, magnetic means carried by said first bimetal means for operating said electrical switch means by controlling the movement of said movable blade through magnetic attraction between said magnetic means and said armature, means for rotatably mounting said first bimetal means on said mounting plate, anticipation heating means connected with said electrical switch means and disposed in heating proximity to said first bimetal means, and second bimetal means having a delayed thermal response in comparison to the thermal response of said first bimetal means, said second bimetal means engaging said means for rotatably mounting said first bimetal means on said mounting plate to rotate said first bimetal means in a second direction opposite to said first direction to compensate for the response of said first bimetal means to prolonged energization of said anticipation heating means.

23. The invention as recited in claim 22 wherein said anticipation heating means is disposed adjacent said first bimetal means, and said second bimetal means is positioned relatively remotely from said anticipation heating means in comparison to the position of said first bimetal means whereby said first bimetal means responds to energization of said anticipation heating means before said second bimetal responds thereto.

24. The invention as recited in claim 22 wherein said second bimetal means is thicker than said first bimetal means and has a slower thermal response than said first bimetal means whereby said first bimetal means responds to energization of said anticipation heating means before said second bimetal means responds thereto.